(12) United States Patent
Lunttila et al.

(10) Patent No.: US 10,455,553 B2
(45) Date of Patent: Oct. 22, 2019

(54) CONTROL CHANNEL ELEMENT INDEXING SCHEME

(71) Applicant: Nokia Siemens Networks Oy, Espoo (FI)

(72) Inventors: Timo Erkki Lunttila, Espoo (FI); Esa Tapani Tiirola, Kempele (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 55 days.

(21) Appl. No.: 13/957,669

(22) Filed: Aug. 2, 2013

(65) Prior Publication Data

US 2014/0036813 A1 Feb. 6, 2014

(30) Foreign Application Priority Data

Aug. 3, 2012 (EP) .................. PCT/EP2012/065234

(51) Int. Cl.
  *H04W 72/04* (2009.01)
  *H04L 5/00* (2006.01)
  *H04L 1/18* (2006.01)

(52) U.S. Cl.
  CPC ....... *H04W 72/0413* (2013.01); *H04L 5/0037* (2013.01); *H04L 5/0055* (2013.01);
  (Continued)

(58) Field of Classification Search
  None
  See application file for complete search history.

(56) References Cited

U.S. PATENT DOCUMENTS

2010/0195583 A1* 8/2010 Nory et al. ................... 370/329
2011/0165906 A1* 7/2011 Papasakellariou et al. .. 455/522
(Continued)

FOREIGN PATENT DOCUMENTS

| CN | 101489255 A | 7/2009 |
|---|---|---|
| CN | 102461051 A | 5/2012 |

(Continued)

OTHER PUBLICATIONS

3 GPP TSG RAN WG1 #69, R1-122259, Samsung, HARQ-ACK PUCCH Resources in Response to ePDCCH Detections, Prague, Czech Republic, May 21-25, 2012, (2 pages).
3GPP TSG RAN1 #69, R1-122456, Pantech, "PUCCH resource allocation in response to E-PDCCH", Prague, Czech Republic, May 21-May 25, 2012, (3 pages).
(Continued)

*Primary Examiner* — James P Duffy
(74) *Attorney, Agent, or Firm* — Harrington & Smith

(57) ABSTRACT

The present invention provides a method, a apparatus and computer program product relating to a control channel element indexing scheme. The present invention includes obtaining information regarding first partition elements related to a first partitioning of channel resource elements carrying in downlink a configurable first control channel associated with a data channel, determining a number of second partition elements related to a second partitioning of channel resource elements per first partition element, determining for at least one second partition element a second-partition element index based on information regarding the first partition elements and the determined number, determining for at least one third partition element related to a third partitioning of channel resource elements, a third-partition element index, wherein the second partitioning is related to the allocation of channel resources of the first control channel, and wherein the third partitioning is related to allocating channel resources of a second control channel.

20 Claims, 8 Drawing Sheets

(52) U.S. Cl.
CPC ........... *H04L 5/0091* (2013.01); *H04W 72/04* (2013.01); *H04L 1/1861* (2013.01)

(56) References Cited

U.S. PATENT DOCUMENTS

| | | | |
|---|---|---|---|
| 2011/0299490 A1* | 12/2011 | Nordstrom et al. | 370/329 |
| 2012/0106465 A1 | 5/2012 | Haghighat et al. | 370/329 |
| 2013/0242890 A1* | 9/2013 | He | H04W 28/0268 370/329 |
| 2013/0301542 A1* | 11/2013 | Krishnamurthy et al. | 370/329 |
| 2014/0036813 A1 | 2/2014 | Lunttila et al. | 370/329 |

FOREIGN PATENT DOCUMENTS

| | | |
|---|---|---|
| CN | 102612094 A | 7/2012 |
| JP | 2012515497 A | 7/2012 |
| JP | 6118409 B2 | 4/2017 |
| WO | WO-201082877 A1 | 7/2010 |
| WO | WO 2011/137383 A1 | 11/2011 |
| WO | WO-2013/138773 A1 | 9/2013 |

OTHER PUBLICATIONS

3GPP TSG RAN WG1 Meeting #69, R1-122146, ZTE, "Consideration for PUCCH enhancement", Prague, Czech Republic, May 21-25, 2012, (3 pages).

Sesia, et al., "LTE—The UMTS Long Term Evolution: From Theory to Practice", Jan. 31, 2012 (Jan. 31, 2012), Chichester, GB, XP002695458, (12 pages).

3GPP TSG RAN WG1 Meeting #69, R1-122247, Prague, Czech Republic, May 12-25, 2012, "PUCCH Resource Allocation for UL CoMP".

3GPP TSG RAN WG1 #69, R1-122259, Prague, Czech Republic, May 21-25, 2012, "HARQ-ACK PUCCH Resources in Response to EPDCCH Detection".

Office action that issued for CN Application No. 201280075662.4 dated Nov. 10, 2016 with English translation.

Asustek: "PUCCH Resource Allocation Corresponding to ePDCCH" 3GPP Draft; R1-122614, $3^{rd}$ Generation Partnership Project (3GPP), Mobile Competence Centre; 650, Route Des Lucioles; F-06921 Sophia-Antiplois Cedex; France, vol. RAN WG1, No. Prague, Czech; May 12, 2012.

\* cited by examiner

| PDCCH CCE | UE#1 | UE#2 | UE#3 | | | UE#4 | | | UE#5 | |
|---|---|---|---|---|---|---|---|---|---|---|
| | 0 | 1 | 2 | 3 | 4 | 5 | 6 | 7 | 8 | 9 |
| PUCCH RESOURCE # | 0 | 1 | 2 | 3 | 4 | 5 | 6 | 7 | 8 | 9 |

FIG.1

| PRB | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| eCCE INDEXING | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 |
| | 150 | 151 | 152 | 153 | 154 | 155 | 156 | 157 | 158 | 159 | 160 | 161 | 162 | 163 | 164 | 165 | 166 | 167 | 168 | 169 | 170 | 171 | 172 |

| 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|
| 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98 | 99 |
| 123 | 124 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 | 149 |
| 173 | 174 | 175 | 176 | 177 | 178 | 179 | 180 | 181 | 182 | 183 | 184 | 185 | 186 | 187 | 188 | 189 | 190 | 191 | 192 | 193 | 194 | 195 | 196 | 197 | 198 | 199 |

FIG.2

| CELL SPECIFIC | | | | | | | | | | | | | | | | | | | | | | | | |
|---|---|---|---|---|---|---|---|---|---|---|---|---|---|---|---|---|---|---|---|---|---|---|---|---|
| PRB INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | |
| ePDCCH PRBs | e | e | | | | | | | | e | e | | | | | e | e | e | | | | | | |
| eCCE INDEXING | k | k+4 | | | | | | | | k+8 | k+12 | | | | | k+16 | k+20 | k+24 | | | | | | |
| | k+1 | k+5 | | | | | | | | k+9 | k+13 | | | | | k+17 | k+21 | k+25 | | | | | | |
| | k+2 | k+6 | | | | | | | | k+10 | k+14 | | | | | k+18 | k+22 | k+26 | | | | | | |
| | k+3 | k+7 | | | | | | | | k+11 | k+15 | | | | | k+19 | k+23 | k+27 | | | | | | |

| 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|
| | | e | e | e | | | | | | | | e | e | e | | | | | | | | e | e | | | |
| | | k+28 | k+32 | k+36 | | | | | | | | k+40 | k+44 | | | | | | | | | k+48 | k+52 | | | |
| | | k+29 | k+33 | k+37 | | | | | | | | k+41 | k+45 | | | | | | | | | k+49 | k+53 | | | |
| | | k+30 | k+34 | k+38 | | | | | | | | k+42 | k+46 | | | | | | | | | k+50 | k+54 | | | |
| | | k+31 | k+35 | k+39 | | | | | | | | k+43 | k+47 | | | | | | | | | k+51 | k+55 | | | |

FIG.3

| CELL SPECIFIC | | | | | | | | | | | | | | | | | | | | | | | |
|---|---|---|---|---|---|---|---|---|---|---|---|---|---|---|---|---|---|---|---|---|---|---|---|
| PRB INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| ePDCCH PRBs | e | e | | | | | | | | | e | e | | | | e | e | e | | | | | |
| eCCE INDEXING | k | k+4 | | | | | | | | | k+8 | k+12 | | | | k+16 | k+20 | k+24 | | | | | |
| | k+1 | k+5 | | | | | | | | | k+9 | k+13 | | | | k+17 | k+21 | k+25 | | | | | |
| | k+2 | k+6 | | | | | | | | | k+10 | k+14 | | | | k+18 | k+22 | k+26 | | | | | |
| | k+3 | k+7 | | | | | | | | | k+11 | k+15 | | | | k+19 | k+23 | k+27 | | | | | |
| PUCCH INDEXING | k | k+1 | | | | | | | | | k+2 | k+3 | | | | k+4 | k+5 | k+6 | | | | | |
| | k+8 | k+9 | | | | | | | | | k+10 | k+11 | | | | k+8 | k+9 | k+10 | | | | | |
| | k+16 | k+17 | | | | | | | | | k+16 | k+17 | | | | k+18 | k+19 | k+18 | | | | | |
| | k+24 | k+24 | | | | | | | | | k+25 | k+25 | | | | k+26 | k+26 | k+27 | | | | | |

| 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|
| | | e | e | e | | | | | | | | | e | e | | | | | | e | e | e | e | e | e | e |
| | | k+28 | k+32 | k+36 | | | | | | | | | k+40 | k+44 | | | | | | k+48 | k+52 | k+56 | k+60 | k+64 |
| | | k+29 | k+33 | k+37 | | | | | | | | | k+41 | k+45 | | | | | | | k+49 | k+53 | k+57 | k+61 | k+65 |
| | | k+30 | k+34 | k+38 | | | | | | | | | k+42 | k+46 | | | | | | | k+50 | k+54 | k+58 | k+62 | k+66 |
| | | k+31 | k+35 | k+39 | | | | | | | | | k+43 | k+47 | | | | | | | k+51 | k+55 | k+59 | k+63 | k+67 |
| | | k+7 | k | k+1 | | | | | | | | | k+2 | k+3 | | | | | | | k+4 | k+5 | k+6 | k+7 | k+32 |
| | | k+11 | k+12 | k+13 | | | | | | | | | k+14 | k+15 | | | | | | | k+12 | k+13 | k+14 | k+15 | k+40 |
| | | k+19 | k+20 | k+21 | | | | | | | | | k+20 | k+21 | | | | | | | k+22 | k+23 | k+22 | k+23 | k+48 |
| | | k+27 | k+28 | k+28 | | | | | | | | | k+29 | k+29 | | | | | | | k+30 | k+31 | k+30 | k+31 | k+56 |

| UE SPECIFIC PRB INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|---|
| ePDCCH PRBs | | | | | | | | | | | | | | | | | | | | | | | |
| UE#1 | e | e | e | e | | | | | | e | e | | | | | | e | e | e | e | | | |
| UE#2 | | | e | e | | | | | | | | e | e | e | | | | | e | e | | | |
| UE#3 | | e | e | | | | | | | e | | e | | e | | | | e | | | | | |
| eCCE INDEXING UE#1 | l | l+4 | | | | | | | l+8 | l+9 | | l+12 | | | | l+16 | l+17 | | | | | | |
| | l+1 | l+5 | | | | | | | l+9 | l+13 | | l+13 | | | | l+17 | l+18 | | | | | | |
| | l+2 | l+6 | | | | | | | l+10 | l+14 | | l+14 | | | | l+18 | l+19 | | | | | | |
| | l+3 | l+7 | | | | | | | l+11 | l+15 | | l+15 | | | | l+19 | | | | | | | |
| eCCE INDEXING UE#2 | | | m | m+4 | | | | | | | | m+8 | m+12 | | | | | m+16 | m+20 | m+24 | | | |
| | | | m+1 | m+5 | | | | | | | | m+9 | m+13 | | | | | m+17 | m+21 | m+25 | | | |
| | | | m+2 | m+6 | | | | | | | | m+10 | m+14 | | | | | m+18 | m+22 | m+26 | | | |
| | | | m+3 | m+7 | | | | | | | | m+11 | m+15 | | | | | m+19 | m+23 | m+27 | | | |
| eCCE INDEXING UE#3 | | n | n+4 | | | | | | n+8 | | n+12 | | | | | n+16 | n+20 | n+24 | | | | | |
| | | n+1 | n+5 | | | | | | n+9 | | n+13 | | | | | n+17 | n+21 | n+25 | | | | | |
| | | n+2 | n+6 | | | | | | n+10 | | n+14 | | | | | n+18 | n+22 | n+26 | | | | | |
| | | n+3 | n+7 | | | | | | n+11 | | n+15 | | | | | n+19 | n+23 | n+27 | | | | | |

| | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|---|
| | | | e | e | e | e | e | e | | | | | | e | e | e | e | | | | | e | e | e | e | | |
| | | | | | | e | e | | | | | | | e | e | | | | | | | | e | e | | | |
| | | | e | | e | | | e | | | | | | e | | e | | | | | | e | | | e | | |
| | | | l+28 | l+32 | l+36 | | | | | | | | | l+40 | l+44 | | | | | | | l+48 | l+52 | | | | |
| | | | l+29 | l+33 | l+37 | | | | | | | | | l+41 | l+45 | | | | | | | l+49 | l+53 | | | | |
| | | | l+30 | l+34 | l+38 | | | | | | | | | l+42 | l+46 | | | | | | | l+50 | l+54 | | | | |
| | | | l+31 | l+35 | l+39 | | | | | | | | | l+43 | l+47 | | | | | | | l+51 | l+55 | | | | |
| | | | | | | m+28 | m+32 | m+36 | | | | | | | m+40 | m+44 | | | | | | | m+48 | m+52 | | | |
| | | | | | | m+29 | m+33 | m+37 | | | | | | | m+41 | m+45 | | | | | | | m+49 | m+53 | | | |
| | | | | | | m+30 | m+34 | m+38 | | | | | | | m+42 | m+46 | | | | | | | m+50 | m+54 | | | |
| | | | | | | m+31 | m+35 | m+39 | | | | | | | m+43 | m+47 | | | | | | | m+51 | m+55 | | | |
| | | | n+28 | n+32 | n+36 | | | | | | | | n+40 | n+44 | | | | | | | n+48 | n+52 | | | | | |
| | | | n+29 | n+33 | n+37 | | | | | | | | n+41 | n+45 | | | | | | | n+49 | n+53 | | | | | |
| | | | n+30 | n+34 | n+38 | | | | | | | | n+42 | n+46 | | | | | | | n+50 | n+54 | | | | | |
| | | | n+31 | n+35 | n+39 | | | | | | | | n+43 | n+47 | | | | | | | n+51 | n+55 | | | | | |

| UE SPECIFIC | | | | | | | | | | | | | | | | | | | | | | |
|---|---|---|---|---|---|---|---|---|---|---|---|---|---|---|---|---|---|---|---|---|---|---|
| PRB INDEX | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| ePDCCH PRBs UE#1 | e | e | | | | | | | | | e | e | | | | | | | | | e | e | |
| eCCE INDEXING UE#1 | I | I+8 | | | | | | | | | I | I+8 | | | | | | | | | I | I+8 | |
| | I+1 | I+9 | | | | | | | | | I+1 | I+9 | | | | | | | | | I+1 | I+9 | |
| | I+2 | I+10 | | | | | | | | | I+2 | I+10 | | | | | | | | | I+2 | I+10 | |
| | I+3 | I+11 | | | | | | | | | I+3 | I+11 | | | | | | | | | I+3 | I+11 | |
| | I+4 | I+12 | | | | | | | | | I+4 | I+12 | | | | | | | | | I+4 | I+12 | |
| | I+5 | I+13 | | | | | | | | | I+5 | I+13 | | | | | | | | | I+5 | I+13 | |
| | I+6 | I+14 | | | | | | | | | I+6 | I+14 | | | | | | | | | I+6 | I+14 | |
| | I+7 | I+15 | | | | | | | | | I+7 | I+15 | | | | | | | | | I+7 | I+15 | |

| 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|
| | | | | | | | e | e | | | | | | | | | | | | | | | | | | |
| | | | | | | | I | I+8 | | | | | | | | | | | | | | | | | | |
| | | | | | | | I+1 | I+9 | | | | | | | | | | | | | | | | | | |
| | | | | | | | I+2 | I+10 | | | | | | | | | | | | | | | | | | |
| | | | | | | | I+3 | I+11 | | | | | | | | | | | | | | | | | | |
| | | | | | | | I+4 | I+12 | | | | | | | | | | | | | | | | | | |
| | | | | | | | I+5 | I+13 | | | | | | | | | | | | | | | | | | |
| | | | | | | | I+6 | I+14 | | | | | | | | | | | | | | | | | | |
| | | | | | | | I+7 | I+15 | | | | | | | | | | | | | | | | | | |

FIG.6

CONTROL CHANNEL ELEMENT INDEXING SCHEME

FIELD OF THE INVENTION

The present invention relates to a control channel element indexing scheme. In particular, this invention relates to LTE-Advanced system which will most likely be part of LTE Rel. 11. More specifically, the present invention relates to ePDCCH eCCE indexing to support implicit HARQ-ACK resource allocation. Namely, the present invention focuses on Physical Uplink Control Channel (PUCCH) resource allocation in Uplink (UL) in the case when enhanced PDCCH (Physical Downlink Channel) is occupied.

BACKGROUND OF THE INVENTION

Enhanced PDCCH (ePDCCH) is a Rel-11 feature currently standardized in the 3GPP in the Enhanced downlink control channel(s) for LTE Work Item. The main motivation behind ePDCCH is to improve control channel performance (especially capacity and coverage) in the case of new Rel-10/11 features such as CoMP (Coordinated Multipoint Transmission/Reception), DL MIMO (Downlink Multiple Input Multiple Output), Heterogeneous Network and Carrier Aggregation (including extension carrier). In the case ePDCCH is used to schedule downlink data on PDSCH (this is the main use case for ePDCCH), there is a need to provide uplink control channel resource(s) for HARQ-ACK transmitted on PUCCH as response to received PDSCH. The topic has received attention in the last couple of 3GPP RAN WG1 meetings #69 and #69bis.

The latest agreement of these meetings is that the PUCCH Format 1a/1b resource for HARQ-ACK transmission in response to ePDCCH-scheduled PDSCH is at least partly implicitly determined. Which resource index could be used therefore still has to be further discussed. Further, it has been agreed that specification support for avoiding collisions of PUCCH format 1a/1b resources corresponding to ePDCCH and PDCCH is provided. However, it still has to be discussed how to provide such a collision avoidance.

In LTE Rel-8 the implicit PUCCH resource determination is based on the lowest index of the scheduling CCE. With ePDCCH, the CCE concept is replaced with so called eCCEs (enhanced Control Channel Elements). The present invention presents an indexing scheme for ePDCCH eCCEs necessary for supporting implicit resource allocation for HARQ-ACK.

The PUCCH resource allocation for dynamically scheduled PDSCH ACK/NACKs in LTE Release 8 and beyond is based on implicit mapping. To be specific, the index of the lowest PDCCH Control Channel Element (CCE) scheduling the PDSCH determines directly the index of the PUCCH resource used for ACK/NACK signalling, i.e. there is a one-to-one mapping between the CCE and the PUCCH resource indices. An example of this basic principle is illustrated in FIG. 1.

The implicit resource allocation has the benefit that it minimizes the UL overhead as dedicated PUCCH resources do not need to be reserved for each UE. The basic principle is very attractive with ePDCCH as well. As one of the main motivations for the introduction of ePDCCH is increased control channel capacity, the number of scheduled users is expected to increase making efficient PUCCH usage even more important.

As mentioned above, the latest agreement in the 3GPP confirms that DL HARQ-ACK resource allocation on PUCCH will be done at least partly implicitly also in the case of ePDCCH.

Regarding the structure of the ePDCCH, there has been an agreement that at least for the case localized allocations, there are typically 4 (potentially 2 or 3 in some specific cases) eCCEs on a PRB. This results in having potentially a very large number of possible eCCE locations and, assuming one-to-one mapping between an index of the eCCE and the index of the PUCCH resource, in an excessively large UL signalling overhead. Therefore, it seems to be clear that there is a need to develop a more efficient eCCE indexing scheme.

As mentioned above, the implicit ACK/NACK resource allocation in LTE Release 8 is based on the CCE indexing. However, such indexing scheme does not exist currently for ePDCCH.

In LTE Rel-8, the PDCCH resources are divided into CCEs which are then simply numbered. However, such an approach is not an attractive one in the case of ePDCCH as due to the nature of ePDCCH the number of resources and hence also the UL overhead would easily become excessive. This is shown in FIG. 2 which illustrates a straightforward extension of Rel-8 approach to support ePDCCH.

SUMMARY OF THE INVENTION

According to the present invention, there are provided a method, apparatus and a program for a control channel element indexing scheme.

According to an aspect of the present invention, there is provided a method comprising:
  obtaining information regarding first partition elements related to a first partitioning of channel resource elements carrying in downlink a configurable first control channel associated with a data channel,
  determining a number of second partition elements related to a second partitioning of channel resource elements per first partition element,
  determining for at least one second partition element a second-partition element index based on information regarding the first partition elements and the determined number,
  determining for at least one third partition element related to a third partitioning of channel resource elements, a third-partition element index,
  wherein the second partitioning is related to the allocation of channel resources of the first control channel, and
  wherein the third partitioning is related to allocating channel resources of a second control channel.

According to further refinements of the invention as defined under the above aspect
  the method further comprises
    receiving a data packet transmitted on the data channel, and
    providing feedback information in uplink direction on the second control channel about successful or unsuccessful reception of the data packet;
  wherein the first partitioning is related to allocating channel resources of the data channel;
  at least one of the second-partition element index and information regarding first partition elements is unique in a cell;
  at least one of the second-partition element index and information regarding first partition elements is unique per user equipment;

each second-partition element index is mapped to one or more third-partition element indexes.
determining the number of second-partition elements comprises deriving the number from a subframe type;
the second-partition element indices are determined so as to form a continuous set of indices;
the second-partition element indices are determined starting from the second-partition element on the first partition element with the lowest index;
the second-partition element indices are determined starting from the second-partition element on the first partition element with the highest index.
determining at least one third-partition element index comprises one-to-one mapping between the second-partition element index and the third-partition element index starting from the lowest second-partition element index;
determining at least one third-partition element index comprises many-to-one mapping between the second-partition element index and the third-partition element index;
the method further comprises a collision avoidance mechanism;
the collision avoidance mechanism comprises including a specific field modifying the implicit uplink channel resource allocation;
the collision avoidance mechanism comprises first control channel scheduling including selecting at least one second-partition element used for the first control channel;
the many-to-one mapping comprises one-to-one mapping between the second-partition element index and the third-partition element index for the second-partition elements contained on one first-partition element;
the method is executed by a user equipment, wherein obtaining information regarding first partition elements includes receiving the information from a base station;
the method further comprises receiving an offset parameter indicating the first second-partition element index from a base station;
the information is included in system information and received via broadcast.
the information is received via a broadcast channel or enhanced broadcast channel;
the information is included in a master information block or system information block;
the information is received via dedicated higher layer radio resource control signaling;
the method is executed by a base station;
the method further comprises
defining an offset parameter indicating the first second-partition element index;
transmitting the offset parameter to a user equipment;
According to another aspect of the present invention, there is provided an apparatus comprising:
a receiver/transmitter configured to communicate with at least another apparatus,
a memory configured to store computer program code, and
a processor configured to cause the apparatus to perform:
obtaining information regarding first partition elements related to a first partitioning of channel resource elements carrying in downlink a configurable first control channel associated with a data channel,
determining a number of second partition elements related to a second partitioning of channel resource elements per first partition element,
determining for at least one second partition element a second-partition element index based on information regarding the first partition elements and the determined number,
determining for at least one third partition element related to a third partitioning of channel resource elements, a third-partition element index,
wherein the second partitioning is related to the allocation of channel resources of the first control channel, and
wherein the third partitioning is related to allocating channel resources of a second control channel.
According to further refinements of the present invention as define dunder the above aspects,
the processor is further configured to cause the apparatus to perform
receiving a data packet transmitted on the data channel, and
providing feedback information in uplink direction on the second control channel about successful or unsuccessful reception of the data packet;
the first partitioning is related to allocating channel resources of the data channel;
at least one of the second-partition element index and information regarding first partition elements is unique in a cell;
at least one of the second-partition element index and information regarding first partition elements is unique per user equipment;
each second-partition element index is mapped to one or more third-partition element indexes;
determining the number of second-partition elements comprises deriving the number from a subframe type;
the second-partition element indices are determined so as to form a continuous set of indices;
the second-partition element indices are determined starting from the second-partition element on the first partition element with the lowest index;
the second-partition element indices are determined starting from the second-partition element on the first partition element with the highest index;
determining at least one third-partition element index comprises one-to-one mapping between the second-partition element index and the third-partition element index starting from the lowest second-partition element index;
determining at least one third-partition element index comprises many-to-one mapping between the second-partition element index and the third-partition element index;
the apparatus further comprises a collision avoidance mechanism;
the collision avoidance mechanism comprises including a specific field modifying the implicit uplink channel resource allocation;
the collision avoidance mechanism comprises first control channel scheduling including selecting at least one second-partition element used for the first control channel;
the many-to-one mapping comprises one-to-one mapping between the second-partition element index and the third-partition element index for the second-partition elements contained on one first-partition element;
the apparatus is a user equipment and obtaining information regarding first partition elements includes receiving the information from a base station.
the processor is further configured to cause the apparatus to perform receiving an offset parameter indicating the first second-partition element index from a base station;

the information is included in system information and received via broadcast;

the information is received via a broadcast channel or enhanced broadcast channel;

the information is included in a master information block or system information block;

the information is received via dedicated higher layer radio resource control signaling;

the apparatus is a base station.

the processor is further configured to cause the apparatus to perform defining an offset parameter indicating the first second-partition element index;

the processor is further configured to cause the apparatus to perform transmitting the offset parameter to a user equipment.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIG. 1 is a diagram illustrating a principle of implicit ACK/NACK resource allocation on PUCCH in LTE Rel 8.

FIG. 2 is a diagram illustrating an exemplary eCCE indexing assuming 50 PRBs and 4 eCCEs per PRB.

FIG. 3 is a diagram illustrating a principle of cell specific eCCE indexing according to the first embodiment of the present invention.

FIG. 4 is a diagram illustrating an example of many-to-one mapping between eCCE index and PUCCH index according to the first embodiment of the present invention.

FIG. 5 is a diagram illustrating a principle of UE specific eCCE indexing according to a second embodiment of the present invention.

FIG. 6 is a diagram illustrating an example of the indexing in case of distributed ePDCCH according to the second embodiment of the present invention.

DETAILED DESCRIPTION

Figure 7:
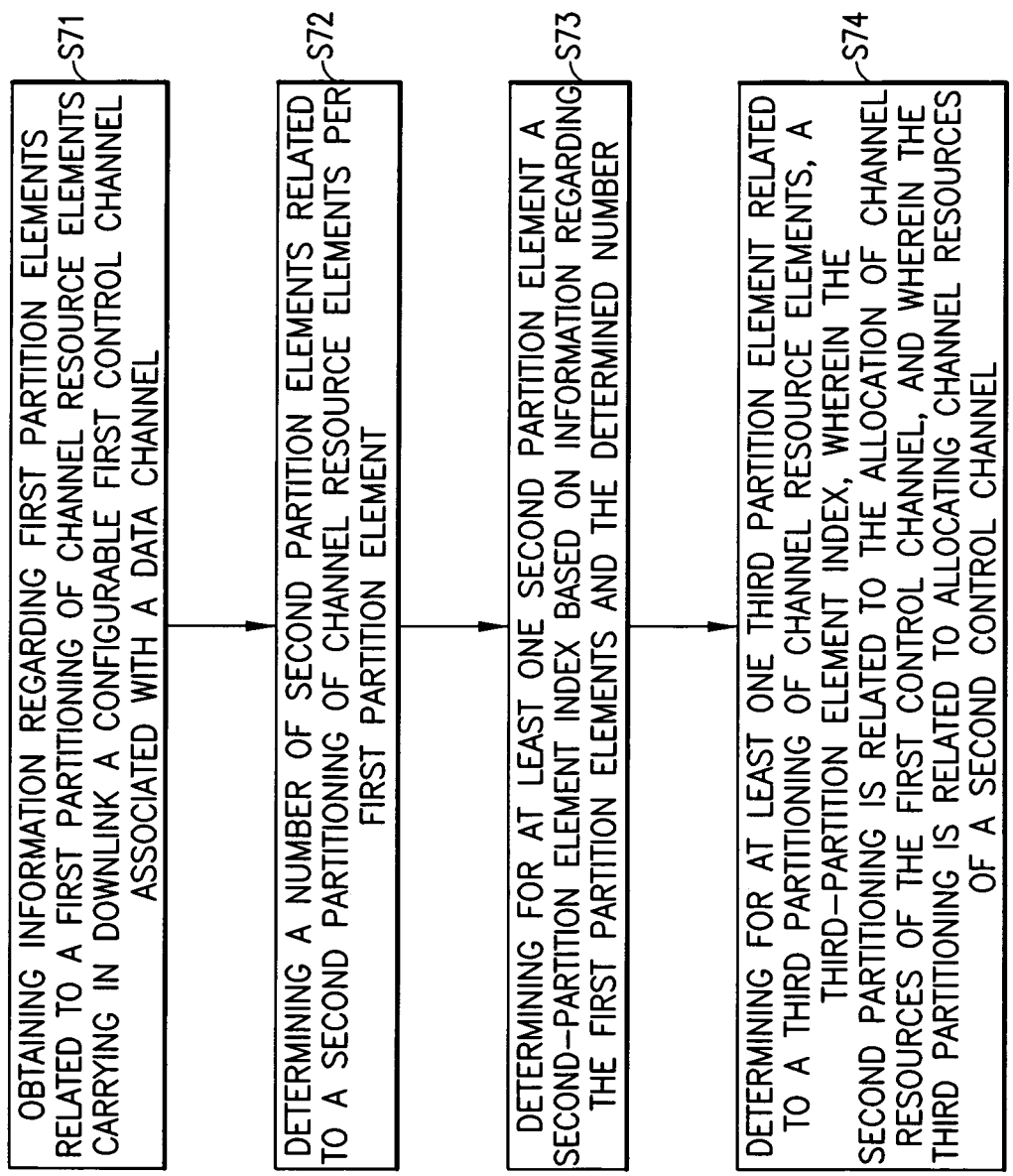
FIG. 7 is a flowchart illustrating a method according to certain embodiments of the present invention.

In the following, embodiments of the present invention are described by referring to general and specific examples of the embodiments, wherein the features of the embodiments can be freely combined with each other unless otherwise described. It is to be understood, however, that the description is given by way of example only, and that the described embodiments are by no means to be understood as limiting the present invention thereto.

The aim of the present invention is to develop eCCE indexing scheme that provides support for resource efficient, signalling efficient and flexible implicit HARQ-ACK resource allocation.

The crystallization of the present invention is to provide eCCE indexing definitions and the related signalling to enable implicit HARQ-ACK resource allocation for PDSCH data packets scheduled via ePDCCH.

Basically, the proposed indexing scheme contains the following steps:

Signalling to at least one UE in the cell information regarding which PRBs may carry ePDCCH.

Reserving a number of eCCEs per allocated PRB according to a pre-defined rule and/or signalling defined.

Determining at least one eCCE index according to a pre-defined rule and signalling received.

Determining at least one PUCCH index based on eCCE index according to a pre-defined rule and signalling received.

Similar method steps are needed at both ends of the uplink radio link. In other words, both UE and eNB implement the indexing scheme similarly in order to transmit and receive HARQ-ACK on the desired resource.

In the following there are described two alternative implementations for the considered invention, namely 'Cell specific eCCE indexing' and 'UE-specific eCCE indexing'.

First Embodiment

In the following, cell specific eCCE indexing according to a first embodiment of the present invention will be described.

According to the first embodiment, it is assumed that the eCCE indexing is done on a cell, or more generically on a transmission point (TP) level. Each ePDCCH capable UE in the cell/TP has the same understanding of the eCCE signaling.

FIG. 3 illustrates a principle of cell specific eCCE indexing. All ePDCCH-capable UEs in the cell know the possible eCCE allocations of all UEs in the cell.

The characteristics of the indexing are as follows:

First, the eNodeB signals to all (ePDCCH capable) UEs in the cell information regarding which PRBs may carry an ePDCCH of at least some of the UEs. Such signaling may be done in different ways. Some examples of possible signaling is described in the following, which is however not intended to limit the invention thereto.

For example, the signaling may be included into the system information and broadcasted to all UEs in the cell using e.g. PBCH, (i.e. included into the MIB), ePBCH (enhanced PBCH) or some SIB.

Further, the signaling may comprise a bitmap indicating the possible ePDCCH PRBs.

Alternatively, the signaling may include e.g. the index of the first ePDCCH PRB or group of PRBs and the relative offset to the next ePDCCH PRB or group of PRBs Moreover, the signaling may be based also on principle of existing resource allocation signaling schemes defined for PDSCH/ePDCCH and signaled using DCI (e.g. distributed allocation).

Then, the UE determines the number N of eCCEs per allocated PRB according to a pre-defined rule and/or signaling available.

For example, this number can be defined by the standard (e.g. set to be four). This has been assumed in FIG. 3 for example.

Alternatively, the number of eCCEs/PRB can be derived from the other known parameters e.g. subframe type (DwPTS, DL subframe, DL subframe with a certain reference signal allocation, DL subframe with certain value for PCFICH).

Moreover, the number may be configured explicitly. The number of eCCE/PRB may also be different for localized and distributed allocations. Presumably, with distributed allocation, there will be a larger number of eCCE on a PRB.

Based on the signaled possible ePDCCH PRB indices, the number N of eCCEs per allocated PRB and some predetermined principles, the UE knows how to index the eCCE space in the cell.

The indexing is continuous and the indexing starts from the eCCEs on the PRB with lowest or highest PRB index. The indexing of eCCEs on different PRBs may be done in different ways, e.g. eCCE-first (as shown in FIG. 3), or PRB-first.

Additionally, the eNodeB may also signal to the UEs an offset parameter, which indicates the index of first ePDCCH eCCE. Such an offset is denoted as "k" in FIG. 3. This parameter allows for controlling the overlap between PUCCH resources allocated implicitly via ePDCCH and PDCCH. The parameter "k" may be either UE or cell specific.

The ePDCCH eCCE index is mapped to PUCCH Format 1a/1b resource index $n_{PUCCH}^{(1)}$.

Such mapping can be one-to-one from e.g. lowest eCCE index of the given ePDCCH to PUCCH resource index as in legacy PDCCH CCE-to-PUCCH mapping case. Final PUCCH resource is obtained based on PUCCH resource index as well as on broadcasted PUCCH parameters.

Alternatively, eCCE index—to—PUCCH index mapping can be many-to-one mapping. This provides further compression on used PUCCH resources. This is beneficial, as there is no need to have a dedicated PUCCH resource for each eCCE: some eCCEs are consumed for UL grants, some UL or DL grants consume multiple eCCEs and some of the HARQ feedback is multiplexed with simultaneous PUSCH transmission.

A crucial aspect on many-to-one mapping is a mechanism for collision avoidance. One known mechanism is to include to the grant a specific field modifying the implicit PUCCH resource allocation. Another option is to avoid collisions via ePDCCH scheduling, that is, the eNB selects eCCEs used for ePDCCHs so that PUCCH resource collisions between UEs are avoided. It is to be noted here that these options can be either used separately or even jointly.

One example of many-to-one mapping supporting the latter option is described below.

The mapping is based on the following observation: The eNB can have CSI of DL channel when ePDCCH is used. The eNB can utilize a limited form of FDPS when selecting PRBs for ePDCCH transmission. Hence, eCCEs mapping to certain PRBs can be preferred for ePDCCH transmission, but there is no difference in signal quality, or preference, between the eCCEs on the same PRB.

In preferred mapping, firstly, eCCEs on the same PRB (such a set of eCCEs is referred to as eCCE group) map to different PUCCH indexes, i.e., one-to-one mapping is used within eCCE group. Secondly, eCCE-to-PUCCH mapping has at most one joint (or shared) PUCCH resource between any two eCCE groups.

Compression is controlled with a broadcasted or RRC signalled parameter β defining how many eCCE indexes map to the same PUCCH index.

With such mapping, eNB can avoid (most) of collisions simply by changing the eCCEs used for the given ePDCCH without need to change PRB allocated for the given ePDCCH.

One exemplary mapping from eCCE index i to PUCCH index is given below, and illustrated in FIG. 4:

$$n_{PUCCH}^{(1)} = (b \bmod \beta^{N-1-a}) + \beta^{N-1-a}\left\lceil \frac{b}{\beta^{N-a}} \right\rceil + \beta^{N-1}\left[a + (N-1)\left\lceil \frac{b}{\beta^N} \right\rceil\right],$$

where α=i mod N and $$b = \left\lceil \frac{i}{N} \right\rceil$$

and ⌈·⌉ defines the largest integer smaller than or equal to the argument.

FIG. 4 illustrates an example on many-to-one mapping between eCCE index and PUCCH index according to the first embodiment for β=2, N=4 and the common offset k for both indexes.

Second Embodiment

Another possible implementation is UE specific eCCE indexing. In the following, UE specific eCCE indexing according to a second embodiment of the present invention will be described.

In the second embodiment, the basic principle is the same as described above in the first embodiment, but the signaling of the ePDCCH eCCEs is done on a UE specific level.

FIG. 5 illustrates a principle of UE specific eCCE indexing.

The main steps according to the second embodiment can be summarized as follows:

The eNodeB signals to ePDCCH capable UEs the information regarding which PRBs may carry an ePDCCH for the UE of interest. Such signaling can be done in various ways. For example, the signaling may be done e.g. via higher layers, such as RRC.

Further, the signaling may comprise a bitmap indicating the possible ePDCCH PRBs.

Alternatively, the signaling may include e.g. the index of the first ePDCCH PRB or group of PRBs and the relative offset to the next ePDCCH PRB or group of PRBs.

Moreover, the signaling may be based also on principle of existing resource allocation signaling schemes defined for PDSCH/ePDCCH (e.g. distributed allocation).

Then, the UE determines the number N of eCCEs per allocated PRB according to a pre-defined rule and/or signaling available, as already mentioned above in the first embodiment.

For example, this number can be defined by the standard e.g. set to be four, which has been assumed in FIG. 5.

Alternatively, the number of eCCEs/PRB can be derived from the other known parameters e.g. subframe type (DwPTS, DL subframe, DL subframe with a certain reference signal allocation, DL subframe with certain value for PCFICH). The number may be configured explicitly. The number of eCCE/PRB may also be different for localized and distributed allocations. Presumably, with distributed allocation there will be larger number of eCCE on a PRB.

Based on the signaled possible ePDCCH PRB indices, the number N of eCCEs per allocated PRB and some predetermined principles, the UE knows how to index its own eCCEs.

For example, the indexing is continuous, and the indexing starts from the eCCEs on the PRB with lowest or highest PRB index. The indexing of eCCEs on different PRBs may be done in different ways, e.g. eCCE-first (as shown in FIG. 5), or PRB-first.

Additionally, the eNodeB may also signal to the UEs a UE specific offset parameter, which indicates the index of the first ePDCCH eCCE.

In FIG. 5, these offset parameters are denoted as I, n, and m for UE #1, UE #2, UE #3, respectively.

This parameter allows for controlling the overlap between PUCCH resources allocated implicitly via ePDCCH and PDCCH.

According to an aspect of the second embodiment, the eNB parameterizes eCCE for different UEs such that the eCCE-PRB indexes are aligned among different UEs. This will simplify the PUCCH resource allocation. UE specific offset also provides for efficient PUCCH resource compression, as multiple UEs can be mapped on fully or partially overlapping eCCE indexes.

The ePDCCH eCCE index is mapped to PUCCH resource index. Same mapping methods as described above in the first embodiment can be applied in the second embodiment. However, in the second embodiment, one-to-one mapping may be preferred although many-to-one mapping is also applicable.

It is noted that the same eCCE indexing principle is applicable with both localized as well as distributed ePDCCH although with distributed ePDCCH a single eCCE may potentially span multiple PRBs, as shown in FIG. 6. Here, the distributed transmission takes place over 4 PRBs, located 10 PRBs apart from each other.

FIG. 6 is a diagram illustrating an example of the indexing in the case of distributed ePDCCH.

In the following, a general example of implementing the present invention is described with reference to FIG. 7 which is applicable to both of the first and the second embodiment described above.

FIG. 7 is a flowchart illustrating processing of the apparatus according to certain embodiments of the present invention. In the present example, the steps as shown in FIG. 7 are executed by a user equipment as well as by a base station, like an eNodeB in a network.

According to the general example of the present invention, first, in a step S71, the apparatus, i.e. the user equipment or the base station, obtains information regarding first partition elements related to a first partitioning of channel resource elements carrying in downlink a configurable first control channel associated with a data channel, and then, in a step S72, determining a number of second partition elements related to a second partitioning of channel resource elements per first partition element. Then, in a step S73, the apparatus determines for at least one second partition element a second-partition element index based on information regarding the first partition elements and the determined number, and determines, in a step S74, for at least one third partition element related to a third partitioning of channel resource elements, a third-partition element index, wherein the second partitioning is related to the allocation of channel resources of the first control channel, and wherein the third partitioning is related to allocating channel resources of a second control channel.

Further, the apparatus may receive a data packet transmitted on the data channel, and provide feedback information in uplink direction on the second control channel about successful or unsuccessful reception of the data packet.

The first partitioning may be related to allocating channel resources of the data channel.

At least one of the second-partition element index and information regarding first partition elements may be unique in a cell.

At least one of the second-partition element index and information regarding first partition elements may be unique per user equipment.

Each second-partition element index may be mapped to one or more third-partition element indexes.

Further, the apparatus may determine the number of second-partition elements comprises deriving the number from a subframe type.

The second-partition element indices may be determined so as to form a continuous set of indices.

The second-partition element indices may be determined starting from the second-partition element on the first partition element with the lowest index.

The second-partition element indices may be determined starting from the second-partition element on the first partition element with the highest index.

The apparatus further may determine at least one third-partition element index comprises one-to-one mapping between the second-partition element index and the third-partition element index starting from the lowest second-partition element index.

Determining at least one third-partition element index may comprise many-to-one mapping between the second-partition element index and the third-partition element index.

Further, there may be provided a collision avoidance mechanism.

The collision avoidance mechanism may comprise including a specific field modifying the implicit uplink channel resource allocation.

The collision avoidance mechanism may comprise first control channel scheduling including selecting at least one second-partition element used for the first control channel.

Further, the many-to-one mapping may comprise one-to-one mapping between the second-partition element index and the third-partition element index for the second-partition elements contained on one first-partition element.

When the method is executed by a user equipment, obtaining information regarding first partition elements may include receiving the information from a base station.

The user equipment may receive an offset parameter indicating the first second-partition element index from a base station.

Further, the information may be included in system information and received via broadcast. The information may be received via a broadcast channel or enhanced broadcast channel. The information may included in a master information block or system information block. The information may received via dedicated higher layer radio resource control signaling.

Further, the method may executed by a base station and may comprise defining an offset parameter indicating the first second-partition element index from a base station and transmitting the offset parameter to a user equipment.

In the following, a specific example of implementing the present invention in a LTE network is described with reference to FIG. 8, which is applicable to both of the first and the second embodiment described above.

Figure 8:
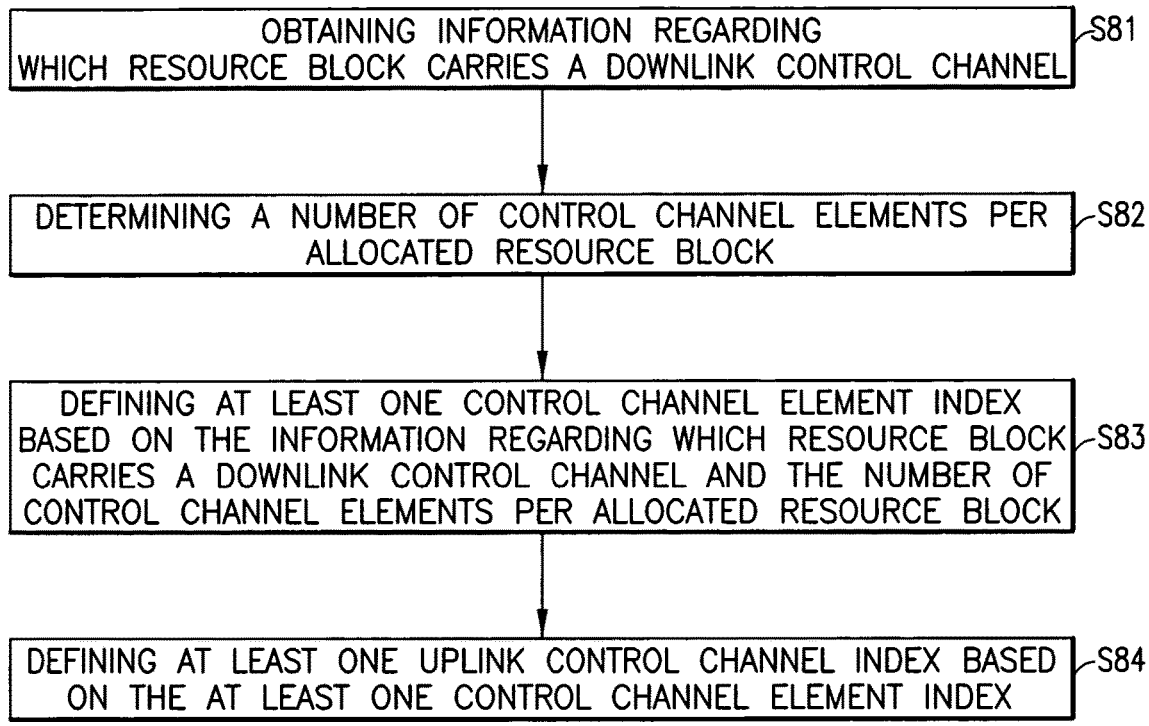
FIG. 8 is a flowchart illustrating another method according to certain embodiments of the present invention.

FIG. 8 is a flowchart illustrating specific processing of the apparatus in a LTE network according to certain embodiments of the present invention. In the present example, the steps as shown in FIG. 8 are executed by a user equipment as well as by a base station, like an eNodeB in a LTE network. However, it is noted that the specific example is merely presented for explanatory purposes and that the present invention is not limited to this specific example.

According to the specific example of the present invention, first, in a step S81, the apparatus, i.e. the user equipment or the base station, obtains information regarding which resource blocks may carry a downlink control channel. Then, in a step S72, the apparatus determines a number of control channel elements per allocated resource block, and then, in a step S73, determines at least one control channel element index based on the information regarding which resource block carries a downlink control channel and the number of control channel elements per allocated resource block. Further, in a step S74, the apparatus determines at least one uplink control channel index based on the at least one control channel element index.

Figure 9:
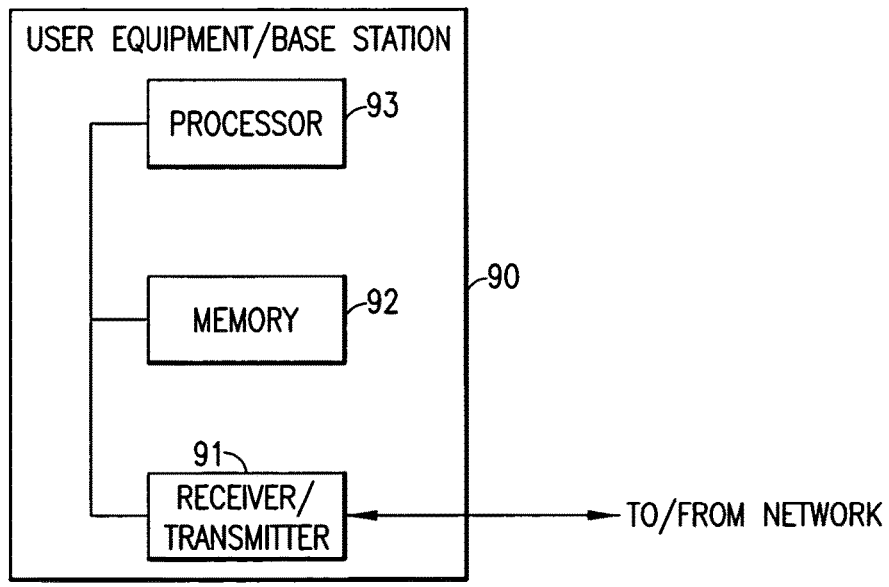
FIG. 9 is a block diagram showing an example of an apparatus according to certain embodiments of the present invention.

FIG. 9 is a block diagram showing an example of an apparatus according to certain embodiments of the present invention.

As shown in FIG. 9, according to an embodiment of the present invention, the apparatus 90, i.e. the user equipment or the base station, comprises a receiver/transmitter 91, a memory 92 and a processor 93. The receiver/transmitter 91 configured to communicate with at least another apparatus in the network and to transmit and receive signals, the memory 92 is configured to store computer program code, and the processor 93 is configured to cause the apparatus to perform obtaining information regarding first partition elements related to a first partitioning of channel resource elements carrying in downlink a configurable first control channel associated with a data channel, determining a number of second partition elements related to a second partitioning of channel resource elements per first partition element, determining for at least one second partition element a second-partition element index based on information regarding the first partition elements and the determined number, determining for at least one third partition element related to a third partitioning of channel resource elements, a third-partition element index, wherein the second partitioning is related to the allocation of channel resources of the first control channel, and wherein the third partitioning is related to allocating channel resources of a second control channel.

As already indicated, the above described two signaling schemes according the first embodiment and the second embodiment are not mutually exclusive, but may also coexist in a given cell/TP. That is, the first embodiment and the second embodiment or some aspects of the first embodiment and some aspects of the second embodiment can be combined.

According to such a possible combination, for example, the eCCEs belonging to the common search space and/or the eCCE having distributed resource allocation are assigned in the cell-specific manner, and the eCCEs belonging to the UE specific search space and/or having localized resource allocation are assigned in the UE-specific manner. Of course, also other combinations are possible.

The above described indexing scheme according to certain embodiments of the present invention is an efficient and simple solution from both UL and DL signalling point of view.

The presented many-to-one mapping supports efficient ePDCCH scheduling based collision avoidance without degrading ePDCCH performance.

The UE-specific approach according to the first embodiment supports dynamic operation wherein the PUCCH resource space reserved for HARQ-ACK transmitted on PUCCH as response to received PDSCH can be scaled up and down relatively fast. Thus, the UE-specific approach provides fast dynamic adaptation of the PUCCH resource space.

In the foregoing exemplary description of the apparatus, i.e. the user equipment or the base station, only the units that are relevant for understanding the principles of the invention have been described using functional blocks. The apparatus may comprise further units that are necessary for its respective operation. However, a description of these units is omitted in this specification. The arrangement of the functional blocks of the apparatus is not construed to limit the invention, and the functions may be performed by one block or further split into sub-blocks.

When in the foregoing description it is stated that the apparatus, i.e. the user equipment or the base station (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BICMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

ABBREVIATIONS

3GPP 3rd Generation Partnership Project
A/N, ACK/NACK Acknowledgement/Negative Acknowledgement
ARI ACK/NACK resource index
CCE Control Channel Element
CDM Code Division Multiplexing
CoMP Coordinated Multipoint
CSI Channel State Information
DL Downlink
DwPTS Downlink Pilot Time Slot
eCCE enhanced Control Channel Element
eNB LTE Base Station, evolved Node B
ePDCCH enhanced PDCCH
FDPS Frequency Domain Packet Scheduling
HARQ Hybrid Automatic Repeat Request
LTE Long Term Evolution
MIB Master Information Block
PCFICH Physical Control Format Indicator Channel
PDCCH Physical Downlink Control Channel
PDSCH Physical Downlink Shared Channel
PRB Physical Resource Block
PUCCH Physical Uplink Control Channel
RRC Radio Resource Control
SIB System Information Block
UE User Equipment
UL Uplink
TP Transmission Point

The invention claimed is:

1. A method, comprising:
obtaining information regarding first partition elements, the first partition elements corresponding to channel resource elements carrying in downlink a configurable first control channel for allocating channel resources to a data channel according to a first partitioning, wherein the first control channel is an enhanced Physical Downlink Control Channel;
determining a number of second partition elements according to a second partitioning of each of the first partition elements, the second partition elements comprising enhanced Control Channel Elements, wherein the enhanced Control Channel Elements can be extended into the enhanced Physical Downlink Control Channel;
determining for at least one second partition element a second-partition element index based on the obtained information regarding the first partition elements and the determined number of second partition elements, wherein:
either the second partition elements are indexed according to a transmission point specific indexing scheme, or
at least one of the second-partition element index and information regarding first partition elements is unique per user equipment;
determining for at least one third partition element related to a third partitioning of channel resource elements, a third-partition element index;
receiving a data packet transmitted on the data channel; and
providing feedback information in uplink direction on a second control channel about successful or unsuccessful reception of the data packet, wherein the second control channel is a Physical Uplink Control Channel, wherein:
the first partitioning is related to a partitioning used for allocating channel resources to the data channel,
the second partitioning is related to the allocation of channel resources of the first control channel, and
the third partitioning is related to allocating channel resources of the second control channel.

2. The method according to claim 1, wherein the second-partition element indexing scheme is specified per transmission point.

3. The method according to claim 1, wherein at least one of the second-partition element index and information regarding first partition elements is unique per user equipment.

4. The method according to claim 1, wherein each second-partition element index is mapped to one or more third-partition element indexes.

5. The method according to claim 1, wherein determining the number of second-partition elements comprises deriving the number from a subframe type.

6. The method according to claim 1, wherein the second-partition element indices are determined so as to form a continuous set of indices.

7. The method according to claim 1, wherein the second-partition element indices are determined starting from the second-partition element on the first partition element with the lowest index.

8. The method according to claim 1, wherein the second-partition element indices are determined starting from the second-partition element on the first partition element with the highest index.

9. The method according to claim 1, wherein determining at least one third-partition element index comprises one-to-one mapping between the second-partition element index and the third-partition element index starting from the lowest second-partition element index.

10. The method according to claim 1, wherein determining at least one third-partition element index comprises many-to-one mapping between the second-partition element index and the third-partition element index.

11. The method according to claim 10, further comprising:
a collision avoidance mechanism.

12. The method according to claim 11, wherein the collision avoidance mechanism comprises including a specific field modifying the implicit uplink channel resource allocation.

13. The method according to claim 11, wherein the collision avoidance mechanism comprises first control channel scheduling including selecting at least one second-partition element used for the first control channel.

14. The method according to claim 10, wherein the many-to-one mapping comprises one-to-one mapping between the second-partition element index and the third-partition element index for the second-partition elements contained on the same one first-partition element.

15. The method according to claim 1, wherein the method is executed by a user equipment, wherein obtaining information regarding first partition elements includes receiving the information from a base station.

16. The method according to claim 15, further comprising:
receiving an offset parameter indicating the first second-partition element index from a base station.

17. An apparatus comprising:
at least one processor; and
at least one non-transitory memory including computer program code, the at least one memory and the computer program code configured, with the at least one processor, to cause the apparatus to perform at least the following:
obtain information regarding first partition elements, the first partition elements corresponding to channel resource elements carrying in downlink a configurable first control channel for allocating channel resources to a data channel, according to a first partitioning, wherein the first control channel is an enhanced Physical Downlink Control Channel;
determine a number of second partition elements according to a second partitioning of each of the first partition elements, the second partition elements comprising enhanced Control Channel Elements, wherein the enhanced Control Channel Elements can be extended into the enhanced Physical Downlink Control Channel;
determine for at least one second partition element a second-partition element index based on the obtained information regarding the first partition elements and the determined number of second partition elements, wherein:
either the second partition elements are indexed according to a transmission point specific indexing scheme, or
at least one of the second-partition element index and information regarding first partition elements is unique per user equipment;
determine for at least one third partition element related to a third partitioning of channel resource elements, a third-partition element index;
receive a data packet transmitted on the data channel; and
provide feedback information in uplink direction on a second control channel about successful or unsuccessful reception of the data packet, wherein the second control channel is a Physical Uplink Control Channel, wherein:
the first partitioning is related to a partitioning used for allocating channel resources to the data channel,
the second partitioning is related to the allocation of channel resources of the first control channel, and
the third partitioning is related to allocating channel resources of the second control channel.

18. A computer program product comprising: a non-transitory computer-readable storage medium bearing computer program code embodied therein for use with a computer, the computer program code comprising code for performing at least the following:
obtaining information regarding first partition, the first partition elements corresponding to channel resource elements carrying in downlink a configurable first control channel for allocating channel resources to a data channel according to a first partitioning, wherein the first control channel is an enhanced Physical Downlink Control Channel;
determining a number of second partition elements according to a second partitioning of each of the first partition elements, the second partition elements comprising enhanced Control Channel Elements, wherein the enhanced Control Channel Elements can be extended into the enhanced Physical Downlink Control Channel;
determining for at least one second partition element a second-partition element index based on the obtained information regarding the first partition elements and the determined number of second partition elements, wherein:
either the second partition elements are indexed according to a transmission point specific indexing scheme, or
at least one of the second-partition element index and information regarding first partition elements is unique per user equipment;
determining for at least one third partition element related to a third partitioning of channel resource elements, a third-partition element index;
receiving a data packet transmitted on the data channel; and
providing feedback information in uplink direction on a second control channel about successful or unsuccessful reception of the data packet, wherein the second control channel is a Physical Uplink Control Channel, wherein:

the first partitioning is related to a partitioning used for allocating channel resources to the data channel, the second partitioning is related to the allocation of channel resources of the first control channel, and the third partitioning is related to allocating channel resources of the second control channel.

19. The apparatus according to claim 17, wherein the second-partition element indexing scheme is specified per transmission point.

20. The apparatus according to claim 17, wherein at least one of the second-partition element index and information regarding first partition elements is unique per user equipment.

* * * * *